United States Patent
Shahab et al.

(10) Patent No.: US 10,305,747 B2
(45) Date of Patent: May 28, 2019

(54) CONTAINER-BASED MULTI-TENANT COMPUTING INFRASTRUCTURE

(71) Applicant: SAP SE, Walldorf (DE)

(72) Inventors: Abin Shahab, Palo Alto, CA (US); Ovidiu Gheorghioiu, Palo Alto, CA (US); Babak Behzad, Palo Alto, CA (US); Tucker Dewitt, Palo Alto, CA (US)

(73) Assignee: SAP SE, Walldorf (DE)

( * ) Notice: Subject to any disclaimer, the term of this patent is extended or adjusted under 35 U.S.C. 154(b) by 141 days.

(21) Appl. No.: 15/352,250

(22) Filed: Nov. 15, 2016

(65) Prior Publication Data

US 2017/0373940 A1    Dec. 28, 2017

Related U.S. Application Data

(60) Provisional application No. 62/353,890, filed on Jun. 23, 2016.

(51) Int. Cl.
| | |
|---|---|
| *G06F 15/173* | (2006.01) |
| *H04L 12/24* | (2006.01) |
| *H04L 12/911* | (2013.01) |
| *G06F 9/50* | (2006.01) |
| *H04L 29/08* | (2006.01) |

(52) U.S. Cl.
CPC ............ *H04L 41/12* (2013.01); *G06F 9/5083* (2013.01); *H04L 47/70* (2013.01); *H04L 67/10* (2013.01)

(58) Field of Classification Search
CPC ......... H04L 41/12; H04L 47/70; H04L 67/10; G06F 9/5083

USPC ....................................................... 709/226
See application file for complete search history.

(56) References Cited

U.S. PATENT DOCUMENTS

| | | | | |
|---|---|---|---|---|
| 7,870,536 | B2 * | 1/2011 | Banavar | G06F 8/20 717/100 |
| 8,051,113 | B1 * | 11/2011 | Shekar | H04L 41/12 707/821 |

(Continued)

OTHER PUBLICATIONS

Pahl et al. (Containers and Clusters for edge cloud architecture 2015) (Year: 2015).*

(Continued)

*Primary Examiner* — Razu A Miah
(74) *Attorney, Agent, or Firm* — Fish & Richardson P.C.

(57) ABSTRACT

Techniques are described for managing compute and storage resources in a container-based, multi-tenant, computing infrastructure. In some implementations, a plurality of containers may each execute an instance of a software framework. Each container may include compute capacity and storage capacity according to the executed framework. Containers may be allocated among clusters in a multi-tenant, cloud-based computing environment based on measured demand for compute capacity and/or storage capacity in the various clusters. In some implementations, a scheduler (e.g., a Level 2 scheduler, or a scheduler of schedulers) determines whether to move compute containers between clusters within a multi-tenant environment, to provide performance improvements, resource utilization efficiency, and cost reduction within the data center, and to satisfy tenant requests for compute and/or storage resources.

16 Claims, 6 Drawing Sheets

(56) References Cited

U.S. PATENT DOCUMENTS

| | | | | |
|---|---|---|---|---|
| 8,695,079 | B1* | 4/2014 | Miller | H04L 63/08 709/223 |
| 8,904,402 | B2* | 12/2014 | McGrath | G06F 9/45558 709/223 |
| 9,256,467 | B1* | 2/2016 | Singh | G06F 9/5055 |
| 9,294,391 | B1* | 3/2016 | Mostert | H04L 61/1511 |
| 9,354,928 | B1 | 5/2016 | Buchheit | |
| 9,900,172 | B2* | 2/2018 | Goel | H04W 4/70 |
| 2005/0256973 | A1* | 11/2005 | Holtz | H04L 41/12 709/245 |
| 2007/0294701 | A1* | 12/2007 | Banavar | G06F 8/20 718/104 |
| 2008/0189400 | A1* | 8/2008 | Norrie | H04L 29/06 709/223 |
| 2008/0209432 | A1* | 8/2008 | Banavar | G06F 8/20 718/104 |
| 2009/0313259 | A1* | 12/2009 | Ivanovic | G06F 16/176 |
| 2011/0307889 | A1* | 12/2011 | Moriki | G06F 9/45558 718/1 |
| 2012/0023187 | A1* | 1/2012 | Pohlmann | H04L 67/1097 709/213 |
| 2012/0041922 | A1* | 2/2012 | Vainer | G06F 16/958 707/608 |
| 2012/0041988 | A1* | 2/2012 | Driesen | G06F 17/30297 707/803 |
| 2012/0159523 | A1* | 6/2012 | Kulkarni | G06F 9/5061 719/328 |
| 2012/0174113 | A1* | 7/2012 | Pohlmann | G06F 9/5088 718/104 |
| 2012/0233118 | A1* | 9/2012 | Holt | H04L 67/06 707/620 |
| 2012/0331144 | A1* | 12/2012 | Supalov | G06F 9/5072 709/226 |
| 2013/0088969 | A1* | 4/2013 | Mukherjee | H04L 43/0882 370/236 |
| 2013/0188512 | A1* | 7/2013 | Norris | H04L 12/4641 370/254 |
| 2013/0239155 | A1* | 9/2013 | Alexander | H04N 21/23805 725/95 |
| 2013/0326507 | A1* | 12/2013 | McGrath | G06F 9/4856 718/1 |
| 2014/0012721 | A1* | 1/2014 | Chittigala | G06F 9/50 705/35 |
| 2014/0149494 | A1* | 5/2014 | Markley | H04L 67/34 709/203 |
| 2015/0058843 | A1* | 2/2015 | Holler | G06F 9/455 718/1 |
| 2015/0120928 | A1* | 4/2015 | Gummaraju | H04L 67/1008 709/226 |
| 2015/0149631 | A1* | 5/2015 | Lissack | H04L 41/5051 709/226 |
| 2015/0154057 | A1* | 6/2015 | McGrath | G06F 9/45533 718/1 |
| 2015/0334110 | A1* | 11/2015 | Bishop | H04L 9/3268 713/156 |

OTHER PUBLICATIONS

Communication and partial European Search Report for related European Application No. 17001049.0-1879, dated Nov. 23, 2017, 16 pages.

Jacob Leverich et al.,"*On the Energy(In)efficiency of Hadoop Clusters*", Perating Systems review, ACM, New York, NY, vol. 44, No. 1, Mar. 12, 2010 (6 pages).

Jiong Xie et al., "*Improving MapReduce performance through data placement in heterogeneous Hadoop clusters*", Parallel & Distributed Processing, Workshops and Ph.D. Forum (IPDPSW), 2010 IEEE International Symposium; Apr. 19, 2010, pp. 1-9, ISBN: 978-1-4244-6533-0.

Communication and Extended European Search Report for related European Appl. No. 17001049.0-1221; dated Jan. 11, 2018; 16 pages.

Anonymous: "Root user or non-root user inside container—Open Source Projects / DockerEngine—Docker Forums", Mar. 2015, X5 pages; P055438105; retrieved from the internet: URL:https://forums.docker.com/t/root-user-or-non-root-user-inside-container/966 [Retrieved on Jan. 4, 2018].

* cited by examiner

CONTAINER-BASED MULTI-TENANT COMPUTING INFRASTRUCTURE

CROSS-REFERENCE TO RELATED APPLICATION AND CLAIM OF PRIORITY

The present disclosure is related to, and claims priority under 35 USC § 119(e) to U.S. Provisional Application Ser. No. 62/353,890, titled "Multi-Tenant Elastic Big Data Infrastructure," which was filed on Jun. 23, 2016, the entirety of which is hereby incorporated by reference into the present disclosure.

BACKGROUND

Large-scale data analytics and intelligence are increasingly important for the successful operations of an organization. To facilitate decision making, large volumes of data may be collected, stored, and analyzed. It may be challenging for all types and sizes of organizations to implement and manage their own big data infrastructure, given that such infrastructure requires large-scale compute, network, and storage resources that would be costly to procure, assemble, and maintain. Thus, on-premises big data operations and in-house management can be cumbersome and expensive. Given such difficulties, big data in the cloud is becoming more commonly used. This cloud-based approach, e.g., subscribing to compute services provided by a third-party vendor over the internet, is also described as a public cloud infrastructure. Cloud-based big data services are gaining popularity due to ease of use, flexibility, cost savings, higher utilization, and in some instances higher performance. Cloud vendors may be able to deliver lower cost services than on-premises options by focusing on high resource utilization and operational automation and sharing support among many clients. However, the increasing popularity of cloud-based big data services creates challenges for scalability and performance.

SUMMARY

Implementations of the present disclosure are generally directed to a container-based, multi-tenant computing infrastructure. More particularly, implementations of the present disclosure are directed to a multi-tenant computing environment that includes multiple clusters, each cluster including one or more containers that each executes a computing framework, the environment further including a scheduler that allocates containers among the clusters to efficiently satisfy the compute resources requests of various tenants using the different clusters.

In general, innovative aspects of the subject matter described in this specification can be embodied in methods that include actions of: receiving metrics from each of a plurality of clusters in a multi-tenant computing environment, the metrics at least indicating available computing resources and pending computing resources on each of the plurality of clusters, wherein the computing resources are provided by containers executing on the plurality of clusters; based at least partly on the metrics indicating that at least one under-utilized container is executing on a first cluster and that a second cluster has pending computing resources, determining a plan to move the at least one under-utilized container from the first cluster to the second cluster; and executing the plan to move the at least one under-utilized container from the first cluster to the second cluster.

These and other implementations can each optionally include one or more of the following innovative features: each of the containers runs an instance of a software framework; each of the containers executing in a cluster synchronizes its time with other processes running in the cluster; each of the containers provides a root user that is a non-privileged user of a computing device that executes the container; the actions further include smoothing the metrics prior to using the metrics to determine the plan; the metrics are generated by at least one of a resource manager or a node manager executing on each of the plurality of clusters; the metrics include one or more of pending memory capacity, pending processor capacity, available memory capacity, available processor capacity, allocated memory capacity, allocated processor capacity, or number of applications currently running; moving the at least one under-utilized container from the first cluster to the second cluster further includes instructing a resource manager of the first cluster to enqueue no further jobs to run on the at least one under-utilized container, allow currently running jobs to terminate and destroy the at least one under-utilized container on the first cluster; moving the at least one under-utilized container from the first cluster to the second cluster further includes launching a new instance of the at least one under-utilized container on the second cluster; the plan is determined based on minimizing a total cost of moving the at least one under-utilized container from the first cluster to the second cluster; and/or the total cost is sum of component costs including one or more of a penalty for moving nodes, a penalty for under-fulfillment, a penalty for over-fulfillment, a reward for data locality, a reward for rack diversity, or a penalty for going below plan minimum.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The implementations described herein provide the following technical improvements and/or advantages over currently used systems. Implementations provide an elastic big data cluster with a compute capacity and a storage capacity that may grow or shrink with usage given the computation and/or storage requirements at any given time. Implementations also provide a cluster on containers, such as Docker containers. The containers are used as a virtualization substrate to secure and isolate multi-tenant machines, and to assist in the fast growth and shrinkage of clusters. Implementations also provide improvements to currently used containers, such as Docker containers, to enable the containers to be run as system container, e.g., containers that are able to run process trees, and are not limited to running only individual processes. Implementations provide improvements to a framework, such as Apache Hadoop, to allow the graceful growth and shrinkage of cluster compute without affecting customer tasks. Implementations provide the growing and/or shrinking of individual containers to support graceful and fast growth and shrinkage of clusters. In some implementations, a linear constraint solver is provided to act as a scheduler of schedulers, e.g., a level 2 scheduler. This level 2 scheduler divides up compute nodes to be used by the individual YARN schedulers of each cluster based on dynamic monitoring of clusters' compute usage patterns. Implementations provide automated methods of recycling containers before transferring them from one cluster to another. This involves the efficient destruction of any residual customer data on the container. Implementations also provide automated methods of monitoring machine health and graceful removal of unhealthy nodes. Moreover, through these various technical advantages and improvements, and by more efficiently allocating compute and/or storage resources among different clusters in a multi-tenant environment, implementations provide a multi-tenant computing infrastructure that more efficiently uses processing capacity, storage space, active memory, network capacity, and/or other computing resources compared to traditional solutions.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for allocating containers among clusters in a multi-tenant, cloud-based computing environment based on measured demand for compute capacity in the various clusters. Implementations described herein provide a mechanism for making cloud-based computing more scalable and better performing compared to traditional systems. Implementations provide a framework that enables elastic, cloud-based big data analytics. In some implementations, the framework includes a scheduler that is responsible for moving compute containers between clusters within a multi-tenant data center, to provide performance improvements, utilization efficiency, and cost reduction within the data center.

Implementations provide for elasticity of compute capacity within a multi-tenant cloud computing environment, by providing a scheduler that allocates containers among multiple clusters in the environment. In situations where there are different customers, e.g., different tenants, being served by a same data center, different clusters in the data center may have different compute requirements at different times, dependent on the particular processes being run for different customers at different times. For example, at a particular time a cluster A may be using all the compute capacity in the data center, and cluster B may be idle. This allocation may be different at another time. Implementations employ a scheduler to re-allocate compute capacity among the clusters as needed to accommodate changing compute requirements of different tenants. The scheduler may receive metrics from clusters indicating their compute needs and their currently used or unused capacity. The scheduler may analyze the metrics and determine a plan to adjust the clusters' compute capacity as needed, e.g., shrink or grow clusters by respectively removing or adding compute capacity. Implementations may employ an orchestrator that carries out scheduler's plan. In some implementations, the scheduler may solve a problem that involves multiple, competing constraints. For example, if cluster A needs compute capacity, the scheduler may determine whether there compute available elsewhere in the data center, what is cost of moving compute capacity to cluster A, how much is a tenant willing to pay for more compute capacity, and/or other constraints. Each constraint may have a cost, and the scheduler may solve the problem by minimizing the total cost across the multiple constraints. In some implementations, each data center includes a scheduler to allocate compute capacity among multiple clusters. The scheduler may run periodically, e.g., every five minutes, to generate change plan that reflects the current needs of the clusters, and the plan may be executed by the orchestrator. The scheduler that allocates capacity among clusters may be described as a Level 2 scheduler, in contrast to the Level 1 scheduler (e.g., resource manager) that schedules processes to be executed within a particular cluster.

Implementations also provide for the (e.g., graceful) changing of clusters, to grow or shrink clusters to accommodate changing compute requirements. In some implementations, clusters may execute multiple containers, each of which runs an instance of Hadoop. A Hadoop instance may have different kinds of jobs that customers may run on it, such as MapReduce jobs, Spark jobs, interactive jobs, and so forth, and each of these different types of jobs may have different characteristics. Implementations operate to shrink cluster in a graceful manner, by determining the tasks currently running on a cluster, determining the characteristics of the tasks being performed on nodes that are to be removed from the cluster, and gradually reducing the number of jobs that are running on the nodes to be removed. Implementations may avoid the sudden killing of a job, instead allowing a job to complete before removing a node from the cluster. For example, a signal may be sent to a Hadoop cluster indicating that it is going to give up certain nodes of compute capacity, so that the cluster may stop enqueuing tasks to be run on the nodes to be removed. Other nodes may then be spawned to start serving other customers. For adding capacity, implementations provide a technique for quickly spawning new nodes when additional compute capacity is required. This is accomplished through imaging of containers such as Docker containers, as described further below. A Docker container may be spawned with an image that includes all the software it needs to readily join a Hadoop cluster and begin providing compute capacity.

At least some implementations employ clusters that use custom virtualization technologies such as Docker containers. The containers may have been enhanced to be able to run Hadoop. Hadoop traditionally does not work well with virtualization. However, a goal of at least some implementations is to deploy Hadoop on Docker containers, which are easy to grow or shrink as needed. In some implementations, the Docker containers have been modified to function well running Hadoop. For example, a container may be modified such that a process may employ SSH to log into a container and interact with the container in a secure fashion. Containers may also be modified to sync their date/time with other processes running in the cluster. The containers may also be modified to output the machine metrics described below. When running Hadoop on a container, the container needs to be able to run multiple processes to make Hadoop work. Accordingly, containers may be modified to include a process manager (e.g., init) that manages the processes running in a container. If the node executing a container has to restart, the process manager may keep track of the jobs previously running and make sure the same jobs are restarted in the same state when the node comes back up.

Moreover, given that containers may be executing in a multi-tenant system supporting multiple customers, a container executing a job for one customer may be running beside other containers executing jobs for other customers. To prevent a particular process of one customer from affecting other customers, containers may be modified to control the designation of the root user in a container. In some implementations, a normal, non-root (e.g., non-privileged) user of the node where a container is running may be designated as the root user (e.g., superuser) of the container. Thus, even if a customer writes code that issues commands using a root account, and that code is running in a container, the commands will be interpreted by the host machine (e.g., the node) as coming from an unprivileged user. Accordingly, implementations provide for the mapping of an unprivileged node user to a privileged container user for a particular container, to ensure security and isolation among containers.

Moving a container from one cluster to another may include deallocating a container on one cluster and allocating a new container on another cluster. For example, the scheduler may determine that cluster A needs more compute capacity and cluster B can give away compute capacity. A container on cluster B may be shrunk and then destroyed, allowing any running processes to exit gracefully as described above. Once it is destroyed, the container may be burned to ensure that any customer data from the partition that was previously used by the container. A new compute node may be created, in a new container, and the new compute node may be instructed that it to be part of cluster A. Through imaging the container that wraps the node, the compute node may quickly join cluster A and begin providing compute capacity. As used herein, a compute node (e.g., ComputeNode) may also be described as a node manager (NodeManager), and one compute node may execute per container. In some implementations, multiple compute nodes may execute within a container. A compute node may be described as being wrapping by a container, such as a Docker container.

A host can be a container or it can be a hardware node, such as a physical computing device, or a viritualization of a computing device. Accordingly, implementations provide a host that may be described as an abstraction layer that obfuscates the underlying computing resources, e.g., hardware or virtual. The underlying platform may be abstracted away from Hadoop running in a container.

In some implementations, a host is provided that supports an execution model such as a version of Yet-Another-Resource-Negotiator (YARN), MapReduce, MapReduce 2 (MR2), and so forth, using containers (e.g., Docker containers) in a multi-node production environment. The multi-node environment may include any suitable number of nodes, for example 1000 nodes. Compute nodes may be dynamically allocated to service the shifting needs of a user (e.g., customer) base. The framework may support any suitable YARN application, including Hadoop MapReduce jobs, Hive on Tez, Spark, Spark-SQL, and so forth. In some implementations, containers may be used to provide elasticity, and enable the system to balance users' dynamic needs for computation with the cost of the underlying infrastructure.

In some instances, public cloud vendors may maximize hardware utilization using multi-tenant resource sharing. In such instances, computing resources are configured to serve multiple consumers using a multi-tenant model that leverages a variety of virtualization technologies. The virtualization technology may involve the use of virtual machines (VMs), a technique that is also known as "hardware virtualization." Containers may also be used to provide a different form of isolation designed to virtualize applications rather than the operating system. While a VM provides a virtual hardware interface that can run a complete operating system, a container offers a virtual operating system interface that can run one or more applications. Use of containers decouples the application from its environment through a consistent virtual interface of the operating system. The container may virtualize the well-defined and semantically rich application-to-OS interface, rather than the OS-to-hardware interface.

The absence of a guest operating system layer makes containers extremely lightweight, reduces complexity, and removes the overhead of intermediate layers, leading to low runtime overhead and low startup latency. These properties, as well as the requirement for a multi-tenant infrastructure in the public clouds for big data analytics, make containers a viable element for use in big data frameworks. This is not only due to the isolation and separation provided by containers, but also due to the increase in resource utilization and performance through efficiently sharing compute capacity between clusters. As used herein, a computer cluster is a set of computers connected by a high-bandwidth network that enables the set of computers to work together to provide a more powerful service than one computer alone may provide.

Implementations provide a host that enables big data analytics in the cloud to be elastic. The host may be configured to allow at least some (e.g., most or all) of the software run on the host to be independent of the underlying platforms, which can be containers, VMs, or physical machines. The host may include a set of interfaces that the various underlying platforms provide, such as process namespaces, file systems, and network. The host may also provide a method of installing the base operating system, in addition to all the packages necessary for the big data framework, on the host.

Once the base framework is installed on a data center infrastructure with the host tools, containerized clusters on the infrastructure can start sharing resources. To orchestrate the resources created with this base framework, implementations include a scheduler that manages the elasticity required by big data analytics by moving compute capacity within the data center, e.g., between clusters. In some implementations, the scheduler monitors the demands of each logical cluster in the data center and determines the compute and/or data storage capacity to allocate for each cluster, based on each cluster's needs. Containers are employed to enable quick response to the clusters' needs for compute capacity. In some implementations, there is a decoupling of compute and storage in the framework.

Implementations provide a containerized big data analytics framework that may be employed in a public cloud. In some implementations, the host may operate to serve compute and storage of big data frameworks, e.g., open source frameworks. The host may provide a layer of abstraction that sits atop the underlying platforms, and that may hide the complexity and diversity of the underlying platforms. The host may be employed in the context of Docker containers and may run Node Managers and Data Nodes on the containers to enable compute capacity to be moved between clusters. In some implementations, the Node Managers may include one or more instances of a YARN NodeManager. In some implementations, the Data Nodes may include one or more instances of a Hadoop Distributed File System (HDFS) DataNode. In some implementations, the scheduling decisions in moving compute nodes between different clusters in a data center may be made with the help of a global scheduler that operates to solve a linear integer programming model.

Software containers, which may be referred to as containers (e.g., in the context of OS-level virtualization), may include kernel namespaces and control groups. In OS-level virtualization, the kernel allows multiple isolated user-space instances to exist instead of just one instance. Containers may use an isolated namespace with limited visibility to the root system. Containers may also use control groups to limit access to resources such as processing, persistent storage, volatile storage, and network bandwidth. This set of mechanisms may give the processes running inside a container the appearance of a full OS while all of the containers share the same underlying kernel.

Another type of virtualization is hardware virtualization using a hypervisor, which involves a VM running a full operating system as a guest. The hypervisor may present these guests with a virtual operating platform and may manage the execution of the guests. This virtual operating platform may simulate a full server hardware stack containing virtual CPU, storage, and network adapters. Docker is an open-source software that automates the process of deploying containers, including isolating resources using Linux kernel namespaces and cgroups. Containers may be categorized into two groups: application containers and system containers. Application containers may run a single or small number of processes as part of an application, e.g., in an application development environment. System containers behave more like a full OS and may run init, inetd, sshd, syslogd, cron, and/or other processes. In some instances, a system container may not support machine-line behavior such as the ability to restart, provide a separate process tree, or provide dedicated network connectivity.

Apache Hadoop is an open-source distributed framework deployed on commodity computer clusters for processing very large datasets, which may also be described as big data. In some instances, Apache Hadoop may provide an entire big data ecosystem. Apache Hadoop may include: Hadoop Common, the libraries and utilities required by other Hadoop modules; HDFS, a distributed file system allowing big files to span across multiple commodity computers; YARN, a resource management system; and several programming models for large scale data processing, such as MapReduce, Tez, Spark, and/or others.

YARN may be responsible for managing the distributed applications running on Apache Hadoop. At the highest level, YARN may include a central Resource Manager (RM), in charge of all the available cluster resources, and a per-machine Node Manager (NM) that manages the resources available on each node through communicating with the RM. The RM is a scheduler that attempts to keep the cluster utilization high while enforcing capacity guarantees and fairness. Each framework that wants to use YARN may provide a service known as an Application Master (AM). The AM is in charge of negotiating resources and requests with the RM and NMs. These resource requests may follow a general resource model, specifying resource name (e.g., host name, rack name, etc.), memory (e.g., in MB), and processing (e.g., number of cores). In some implementations, the resources may be provided in containers, which may be described as YARN containers to avoid confusion with operating system containers. An application may ask for resources with specific resource requests through the AM. The RM may respond to these requests by granting the use of one or more YARN containers, which satisfy the requirements laid out by the AM in the initial resource request. Nodes that run RM (and other Hadoop services) may be described as master nodes, and the nodes that run the NM (and other Hadoop clients) may be described as slave nodes.

Tez and Spark are open-source distributed frameworks. Tez is designed to address limitations of MapReduce by allowing programmers to define a graph of operations, as opposed to a linear flow of operations only in terms of Map, Shuffle, and Reduce functions. Spark uses a data structure called a Resilient Distributed Dataset (RDD) that allows data to be stored in memory, resulting in much better performance than MapReduce, which primarily transfers data to and from disks. Spark may work with different cluster managers and distributed storage systems, including YARN and HDFS.

Apache Kafka is an open-source message broker project originally developed at LinkedIn to be a publish/subscribe system. Kafka provides a unified, high-throughput, low-latency platform for handling real-time data feeds.

In some implementations, the framework provides for separation of compute and storage resources. The compute needs of a Hadoop cluster may vary frequently, while storage needs typically change at a slower pace. However, physical machines are installed with fixed amounts of compute and storage. Decoupling compute from storage may serve to increase compute utilization, as this allows faster changing compute to be added and removed independently of storage. Accordingly, implementations operate such that clusters no longer need to be statically sized for peak compute requirements, and compute resources can be moved from one cluster to another as needed, resulting in higher compute utilization across multiple tenants. The use of containers contributes to this separation, as the containers provide a lightweight virtual environment around the compute and storage daemons of slave nodes, and therefore from the cluster's point of view, provide compute and storage.

In some implementations, the resources of a host machine are divided between different containers using kernel namespaces and control groups. These resources may include processing, memory, network, and the file system. This form of virtualization results in processes that have their own isolated allocations of processing, memory, network, and file system. In some implementations, there is an exception to this isolation such that when containers are launched, the superuser on the host is the same as the superuser inside the container. This allows the superusers of a running container to have full access to all of the files and process namespace of other containers.

For security reasons, a multi-tenant (e.g., Hadoop) cluster cannot have access to the privileges associated with the superuser on the underlying physical machines. Therefore, when the containers are launched, a regular user of the underlying system is mapped to the root user (superuser) inside the container. This technique includes user namespace isolation, in which the entire uid space inside the container is exclusive to that container. The root in that container can perform privileged actions inside the container, but is banned from any privileged action outside of the container.

In some implementations, Hadoop is run on the containers. A Hadoop 2 deployment may include two types of nodes: master and slave nodes. The master nodes may run the ResourceManager (RM) (e.g., for YARN), the NameNode (NN) (e.g., for HDFS), and in some instances other cluster-wide services. The slave nodes may store (e.g., HDFS) data and provide data processing resources (e.g., for YARN). In some implementations, each of the slave nodes may run at least two services: a NodeManager (NM) for YARN and a DataNode (DN) for HDFS.

Figure 1:
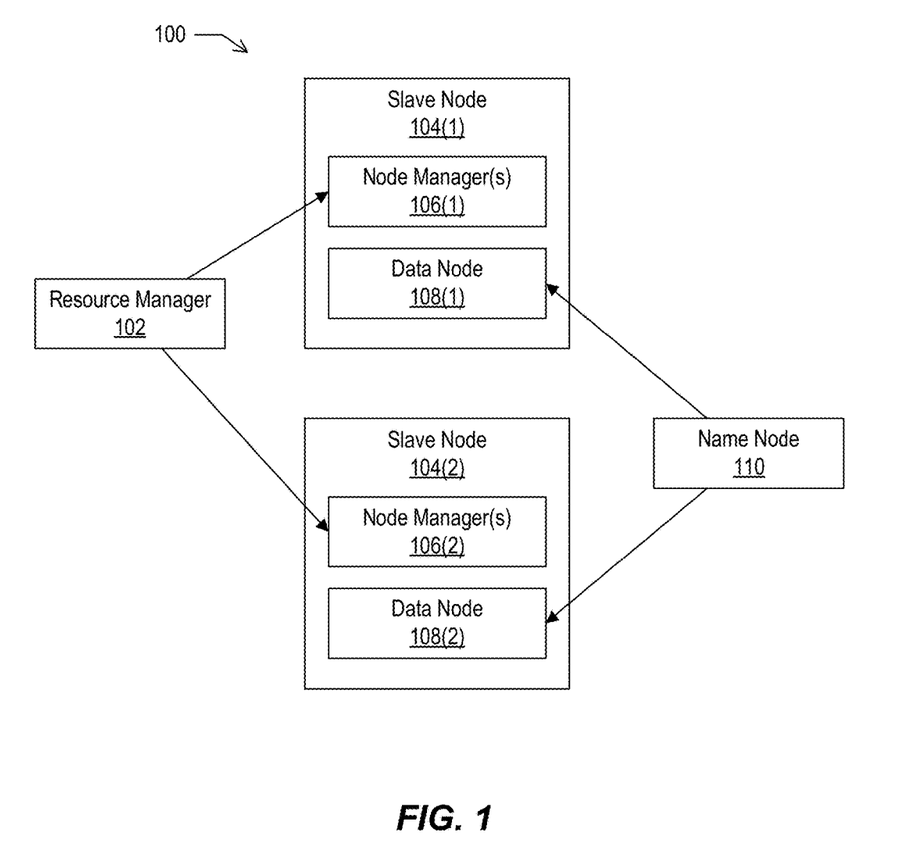
FIG. 1 depicts an example cluster architecture, according to implementations of the present disclosure.

FIG. 1 depicts an example cluster architecture, according to implementations of the present disclosure. In the example of FIG. 1, a cluster 100 is a Hadoop cluster with master nodes and two slave nodes. Master nodes may include a resource manager 102 and a name node 110. Each of the slave nodes 104(1) and 104(2) may include one or more node managers 106 (NM) and a data node 108 (DN). In some examples, the NM and DN are services running on a slave node and they are both tied to that particular machine.

Traditionally, to increase the compute available on a conventional cluster, an administrator typically adds a whole new slave node to it. This action adds both storage and compute to the cluster, even when additional storage may not be necessary. This methodology can be particularly inefficient, given that the compute requirements of a (e.g., Hadoop) cluster can arrive in bursts. A cluster could be mainly idle, but suddenly be called to process large jobs that require a significant compute capacity. In such instances, adding a whole new slave node to the cluster is not efficient and sometimes not practical as well, as the storage portion of the DN can be big and tedious to securely sanitize and reallocate, given that the DN may include a large amount of data (e.g., terabytes).

Implementations provide a solution to this challenge by decoupling compute and storage, by running NM and DN daemons inside containers. Accordingly, implementations provide for one or more NMs and one DN container running on a slave node. If a cluster needs more compute capacity, the host can allocate a NM container to the cluster without provisioning additional storage. Implementations may employ containers instead of virtual machines, given that the use of virtual machines may make it difficult to satisfy the need to allocate compute resources quickly.

For implementations that run Hadoop on containers, the running of Hadoop on containers may involve satisfying certain requirements of Hadoop, given that Hadoop may be generally configured to run on physical or virtual machines. In some implementations, the containers may be able to run multiple processes (e.g., JVM, nrpe daemon, rsyslog, ssh, etc.). Accordingly, the containers may use a process manager. In some implementations, init is used as the process manager. Init has the ability to manage a process tree, take care of orphaned processes, and reap zombie processes. Thus, the containers used by implementations may be described as system containers instead of application containers. In some implementations, supervisord is run on the containers instead of init as a process manager. In addition to the process manager, each of the containers may have a (e.g., large) number of packages installed on them to enable the containers to work as part of the cluster. Such packages may include configuration management (CM) tools that automate the task of configuring and maintaining servers, such as Chef.

In some implementations, Hadoop and its ecosystem run independent of the underlying platform. The goal of this independence, which may be described as an abstraction, is that the software does not need to know whether it is running on a physical machine, a virtual machine, or a container. To implement such an abstraction, implementations may include the following set of interfaces: a Linux kernel, e.g., the latest stable version from kernel.org; a base system such as CentOS 6, e.g., where the system uses System V init, rather than supervisord; a configuration management system, e.g., Chef version 11 and higher; configuration files that describe available persistent storage devices; isolated namespaces for processes, users, and networking; one or more virtual network interfaces, each with its own (e.g., IPv4 RFC-1918) address; and/or a (e.g., X.509) certificate and associated key that allows the host to authenticate itself to a central certificate authority system.

With the interfaces listed above, implementations may support the use of any suitable underlying platform to work as part of a Hadoop cluster. Hadoop clusters may run on physical machines, virtual machines, and/or containers. Clusters can mix any of these resource types. For example, some clusters in a production environment use a combination of physical machines (running both a NM and DN) and containers (running a NM or a DN, but not both). Clusters may also use virtual machines, such as spot instances provided by third party service.

Figure 2:
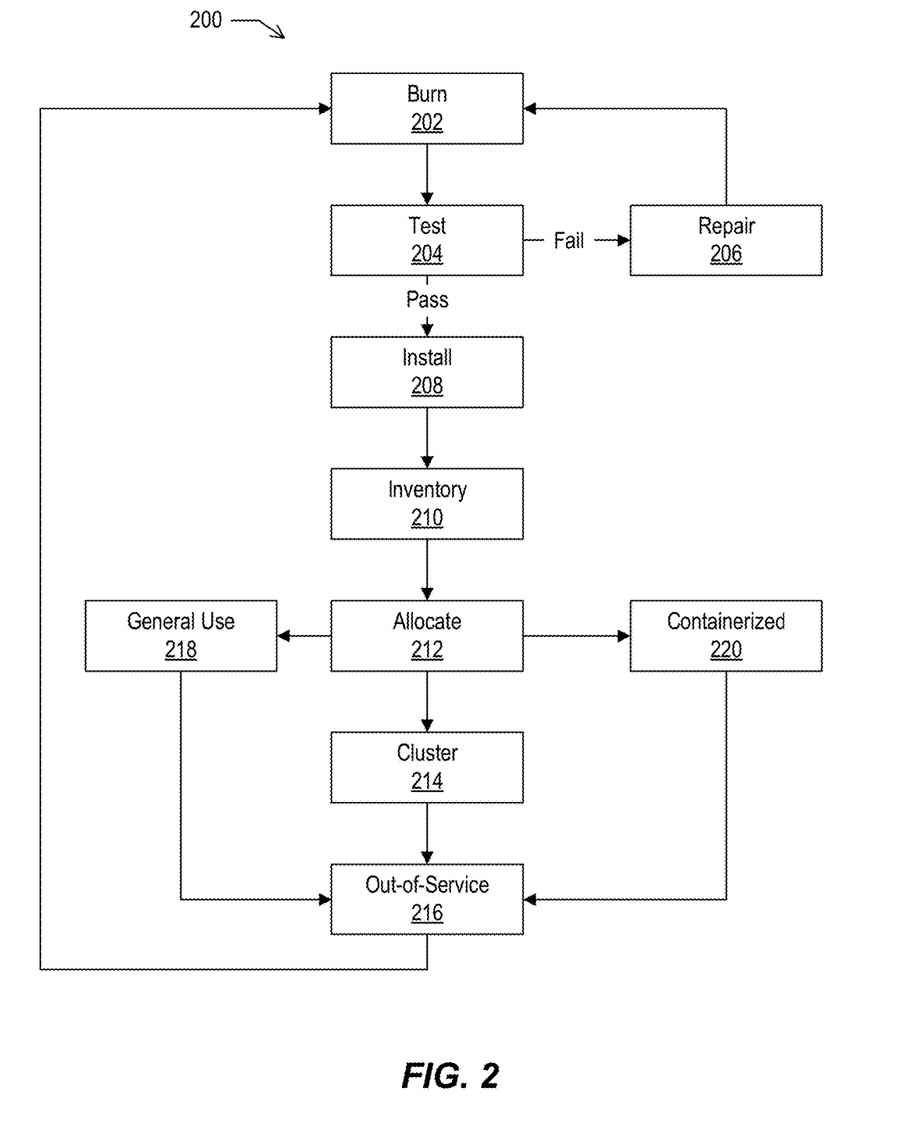
FIG. 2 depicts an example lifecycle for hardware component(s), according to implementations of the present disclosure.

FIG. 2 depicts an example lifecycle 200 for hardware component(s), e.g., physical machines in a data center, according to implementations of the present disclosure. In some implementations, each host may have its storage overwritten, or burned, (202) to ensure that the host does not have any preexisting data on it. After the storage is overwritten, each machine runs a test suite (204). If the tests pass, software is installed (208) on the machine and the machine is put in the inventory (210). If the tests fail, the machine may be repaired (206) and burned (202) again.

After the machine is placed in inventory, the machine may be allocated (212) for general use (218), a cluster (214), and/or containerized 220. General use is for those nodes that are not containerized such the services nodes, e.g. the YARN ResourceManager, the HDFS NameNode, the Altiscale services node used as a firewall, one or more additional Hadoop services, and so forth. After use of the host is complete it may go out-of-service (216) until it is needed again, at which time it may be burned (202) for another use. In some implementations, the burning of a host includes the following steps: 1) zeros are written on every block on the host's file system; 2) the file system is formatted; 3) a new operating system image is put on the host; and 4) hardware tests are run to ensure that every device associated with the host (e.g., disk, memory, CPU, and/or network device(s)) is properly functional.

Figure 3:
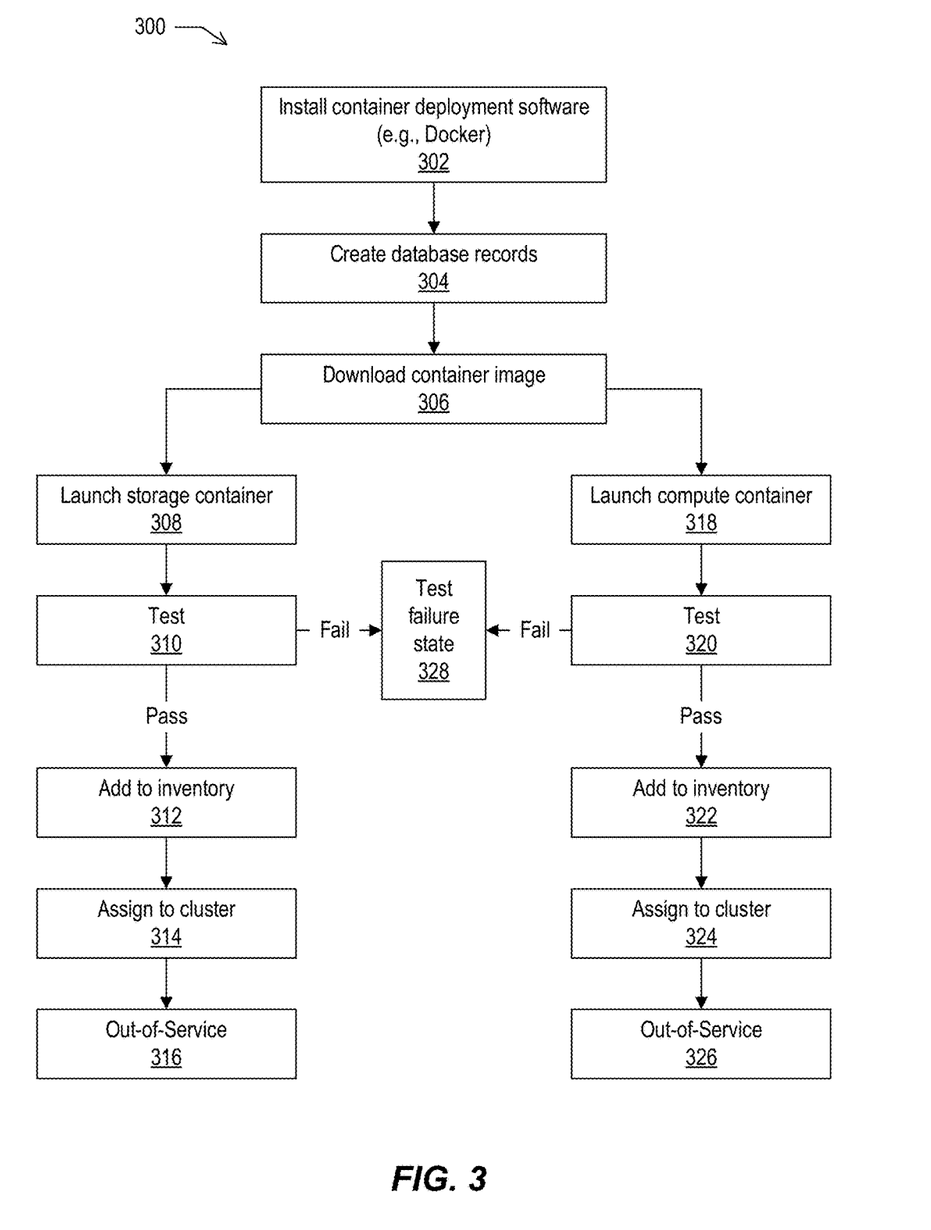
FIG. 3 depicts an example lifecycle for container(s), according to implementations of the present disclosure.

FIG. 3 depicts an example lifecycle 300 for container(s), according to implementations of the present disclosure. FIG. 3 shows more detail regarding the containerization (220) portion of the lifecycle 200 shown in FIG. 2. Container deployment software, e.g., Docker, may be installed (302)

on the node and added to a database through creation of database records (304). The image may be downloaded (306) and, depending on whether the container is a compute or storage container, the storage container is launched (308) or the compute container is launched (318). The container may be tested (310 or 320 respectively). If it passes the test(s), the container may be added to the inventory (312 or 322 respectively). As described in more detail below, the scheduler may assign (314 or 324 respectively) the container from inventory to a cluster that needs container(s). The container(s) may be removed from clusters that have additional compute, and the container(s) may be marked as out-of-service (316 or 326 respectively) before the host(s) are returned to the burn state.

In some implementations, the inventory state of physical machines and containers are similarly managed. For example, both hardware components and containers can be allocated from inventory to clusters. In some implementations, containers may not be recursively divided into sub-containers.

Figure 4:
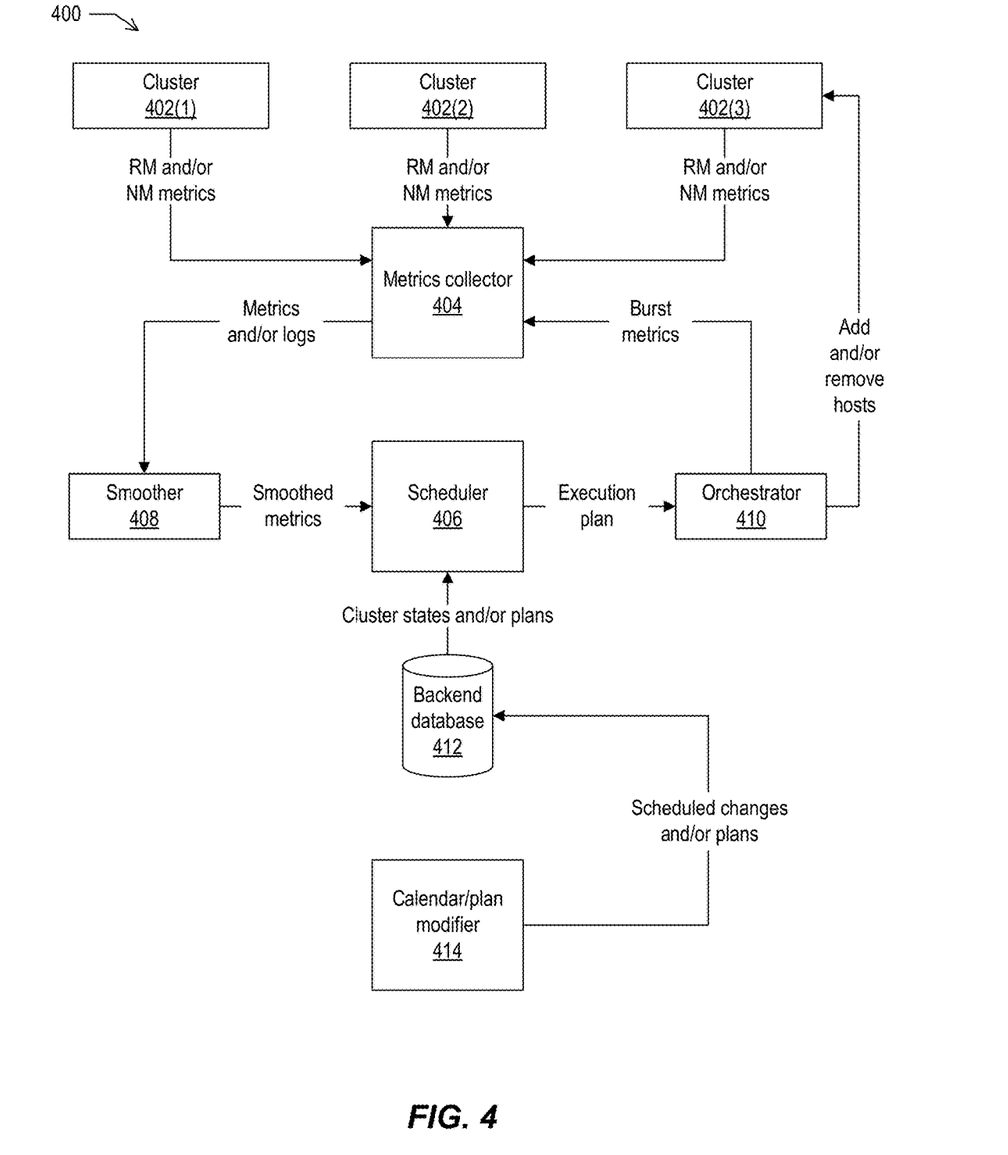
FIG. 4 depicts an example architecture and data flow, according to implementations of the present disclosure.

FIG. 4 depicts an example architecture and data flow 400, according to implementations of the present disclosure. FIG. 4 shows an example of the elasticity framework that may be provided by implementations. The framework may include any suitable number of clusters 402, e.g., three clusters 402(1), 402(2), and 402(3) are shown in the example. The framework may include a metrics collector 404, a scheduler 406, a smoother 408, an orchestrator 410, a backend database 412, and a calendar/plan modifier 414.

In some examples, the scheduler may be described as the main component of this framework, and may include most of the logic to handle the allocation of containers among clusters. The clusters may operate in a data center and, in some instances, may run Hadoop. The Resource Manager (RM) and the Node Manager(s) (NM) of the clusters may periodically (e.g., every 10 seconds) transmit metrics to the metrics collector. The Resource Manager may collect and send metrics such as one or more of the following: PendingMB; PendingVCores; AvailableMB; AvailableVCores; AllocatedMB; and/or AllocatedVCores. The Node manager may collect and send metrics such as NumApplications. In some implementations, PendingMB and PendingVCores represent the amount of memory and processor capacity, respectively, that are pending, e.g., requested by applications and not yet satisfied. AvailableMB and AvailableVCores represent the amount of memory and processor capacity, respectively that the cluster currently has available to use. AllocatedMB and AllocatedVCores represent the amount of memory and processor capacity, respectively, that the cluster has already allocated to the applications. NumApplications is the number of applications that are currently running on that Node Manager.

The metrics collector may receive the metrics produced by the clusters and consumed by the other components of the system. In some implementations, Apache Kafka is employed as the metrics collector. To use Kafka, implementations may employ a component for the Hadoop Metrics2 subsystem called KafkaSink. This sink may regularly emit Hadoop metrics to one or more Kafka brokers. KafkaSink may be enabled on all RMs and NMs of the clusters, and is capable of handling the required amount of data.

The smoother consumes the messages and/or logs from the collector and post-processes the received messages and/or logs into smoothed metrics (e.g., simplified, synthetic inputs) for the scheduler. Such smoothing is performed before performing the actual scheduling because Hadoop metrics may be bursty. Smoothing may enable the addition of capacity to be performed judiciously, e.g., to those clusters that actually require more Node Managers. The smoothing function ensures the scheduler does not react to transient, outlying cluster metrics that do not reflect a sustained and/or ongoing requirement for compute resources.

The scheduler may create a plan for the capacity for each cluster based on the cluster's demands, customer-purchased capacity, and/or other criteria. The scheduler may take as input any suitable number of parameters and, based on the parameter(s), determine how many nodes to add to or remove from a cluster. The output of the scheduler is a sequence of commands to the orchestrator as an execution plan.

The orchestrator converges the actual state of the infrastructure to the planned state of the infrastructure specified by the scheduler. For example, the orchestrator may add or remove containers to or from one or more clusters.

The backend database may store information regarding users (e.g., customers) and their capacity plans along with information about all the hosts, nodes, clusters, and their status. The user data may include data on all user accounts, including information about the compute and storage capacities to which users have subscribed. A user may also be described as a customer or a tenant. The scheduler may employ the user information to make decisions whether compute bursting, e.g., increasing the compute capacity of the cluster, should happen for each cluster and also how much each cluster is allowed to grow or shrink in capacity. The database may also store the service level agreement(s) (SLA) and/or related information necessary for the decision-making process.

The calendar and plan modifier may be employed by users of the clusters to specify planned calendar-based compute bursting using a customer portal, e.g., a web-based administrative interface. These scheduled plans may be stored in the backend database after they are specified in the portal.

As described above, implementations may employ metrics smoothing. In some implementations, the key metrics used from Hadoop's Kafka output stream are PendingMB and/or PendingVCores to indicate unmet demand, and AvailableMB and/or AvailableVCores to detect when capacity can be removed from the cluster. Additionally, implementations may use the AllocatedMB metric to detect recent additions to the cluster, based on the premise that the new capacity should be given some time to make an impact on the cluster before further additions driven by the same demand. Implementations may employ an interval (e.g., 30 minutes) during which recent additions are subtracted from computed load. This information could also be provided by the backend database in addition to or instead of being provided by the Kafka, which may be more convenient. The NumApplications metric may be used to detect which nodes are more loaded than others. The scheduler may prefer removing empty or lightly loaded nodes from a cluster.

In some instances, the Pending and/or Available metrics may not be appropriate for use as load indicators, e.g., to indicate "pressure" on a cluster. For example, immediately after a job starts in Hadoop, all of its containers are pending and a metrics snapshot taken at this point could greatly overestimate the cluster's needs. Moreover, some jobs, despite having large initial resource requirements, finish too quickly for compute capacity adjustments to help.

The smoothing function used by implementations for bursting may examine the recent past and attempt to find the highest number P that satisfies one or more conditions. Such conditions may include, but are not limited to, the following conditions. For example, a condition may be applied such that the Pending metric (overload) was above P for the last T1 seconds. In some implementations, T1 is approximately five minutes, which is commensurate with the reaction/orchestration time. The rationale behind this condition is to identify evidence of consistent load that can readily extend onto the capacity added. As another example, a condition may be applied such that for the last T2 seconds (T2>T1), the Pending metric was above P during at least M % of the time. In some implementations, T2 is 30 minutes and M is 75%. This condition covers sustained interactive use, e.g., many small jobs that may not cause constant high overload, but may nonetheless benefit from faster response time.

In some implementations, the output of the smoothing stage is a single pressure parameter P, which may indicate positive or negative slots for each cluster. In some implementations, the parameter P may be augmented with any suitable information about the urgency of the burst, and may take into account factors such as the duration during which there has been a persistent need for capacity. The parameter P may also prioritize fulfillment of requests sustained for longer periods of time. Further, some implementations may incorporate a time series of jobs, together with their predicted duration, into a time dimension of a linear program.

Unbursting (e.g., removing compute capacity) may use smoothing that is analogous to the first condition above. For example, implementations may employ a negative pressure parameter −P such that the available metric remained above |P| over the last T3 seconds. In some implementations, T3 is 10 minutes, e.g., a longer interval than T2 or T1 because removals can take longer in the infrastructure and it is advantageous to avoid churn if possible. The second trigger condition has no direct equivalent when unbursting, as interactive use may benefit from capacity that is added until needed elsewhere.

The smoothing algorithm described above is an example of a smoothing algorithm that may be employed in implementations. Implementations also support the use of other smoothing algorithms.

In some implementations, there are two sets of inputs to the scheduler: the cluster and user information, stored in the Backend database; and the Hadoop metrics from Kafka, post-processed by the smoother into pressure and node occupancy parameters. In some examples, the core of the scheduler is an integer linear program (ILP) that defines a cost function within the constraints of what are acceptable cluster states. In some implementations, the scheduler uses the GNU Linear Programming Kit (GLPK) to solve this program (e.g., minimizing the cost function) and the scheduler uses the resulting solution determine changes to be made to the clusters.

The target of the optimization is a series of Boolean variables, $A_{i,j}$ signifying, when $A_{i,j}$ is true that node j should be assigned to cluster i. These variables, indicating the difference from the current state, are used to compute the execution steps to adjust compute allocations across clusters. In the linear program, the inventory is a dummy "cluster," with only differences in parameters from an actual cluster. For example, most of the penalties and rewards described in following sections may be zeroed in the dummy "cluster."

In some implementations, a hard constraint is applied to ensure that a single host (e.g., container) can only be assigned to a single cluster at a time. This is atypical compared to traditional scheduling systems, which typically allow resources to be shared between jobs and partition their capacities in the scheduling step. In some implementations, the system creates one containerized NM per physical node. In some implementations, the scheduler may be able to instruct the orchestrator to create multiple NM containers on a physical node. This constraint (e.g., together with rack optimization, described below) may preclude the use of algorithms such as network flow or non-integer linear programming. The problem becomes a superset of the bin-packing problem, known to be NP-complete. However, the ILP solving by GLPK is sufficiently fast and fits well within requirements that may be placed on the system.

In some implementations, e.g., in a fully multi-tenant environment, some form of this constraint may be applied such as "at most N clusters per node." The various penalties and rewards for different constraints of the system may include one or more of the following:

Penalty for moving nodes. Implementations may compute a cost $C_{m,i,j}$ for moving (or keeping) any node j into any cluster i. To simplify the calculation, implementations may add a cost of moving any node from inventory into a cluster, $C_{fromInv,j}$, and the cost of moving nodes that are currently part of a cluster to inventory, $C_{fromInv,j}$. The latter cost may include the "node busy" penalty that is compute based on the NumApplications metric. The cost for keeping a node in its current cluster (or in inventory) may be set to zero.

Penalty for under-fulfillment. The optimal capacity of a cluster may be computed from its existing capacity, plus or minus the current pressure parameter P. Any solution that leaves a cluster i below this number may be penalized by a parameter $C_{u,i}$ multiplied by the missing capacity. This penalty may be a non-linear function. Besides being bounded by zero (e.g., under-fulfillment only), the penalty to increase super-linearly for very high pressure. Otherwise, a cluster with extremely high needs would not receive capacity C ahead of a cluster with more modest needs, because moving C improves the solution by the same amount $C \times C_u$, so other factors would prevail (e.g., not the desired behavior). In some implementations, $C_u$ may be manually adjusted for the two clusters. However, this approach is not optimal because it is desirable to taper the demand once a solution gets close to the ideal capacity. Instead, implementations may make $C_u(C)$ slightly non-linear using the Linear Programming (LP) technique of piecewise linear functions. Implementations may include any suitable number (e.g., three) of statically defined steps. This approach has the effect that high need takes priority until most of that need is satisfied, and only then do implementations consider lower needs.

Figure 5:
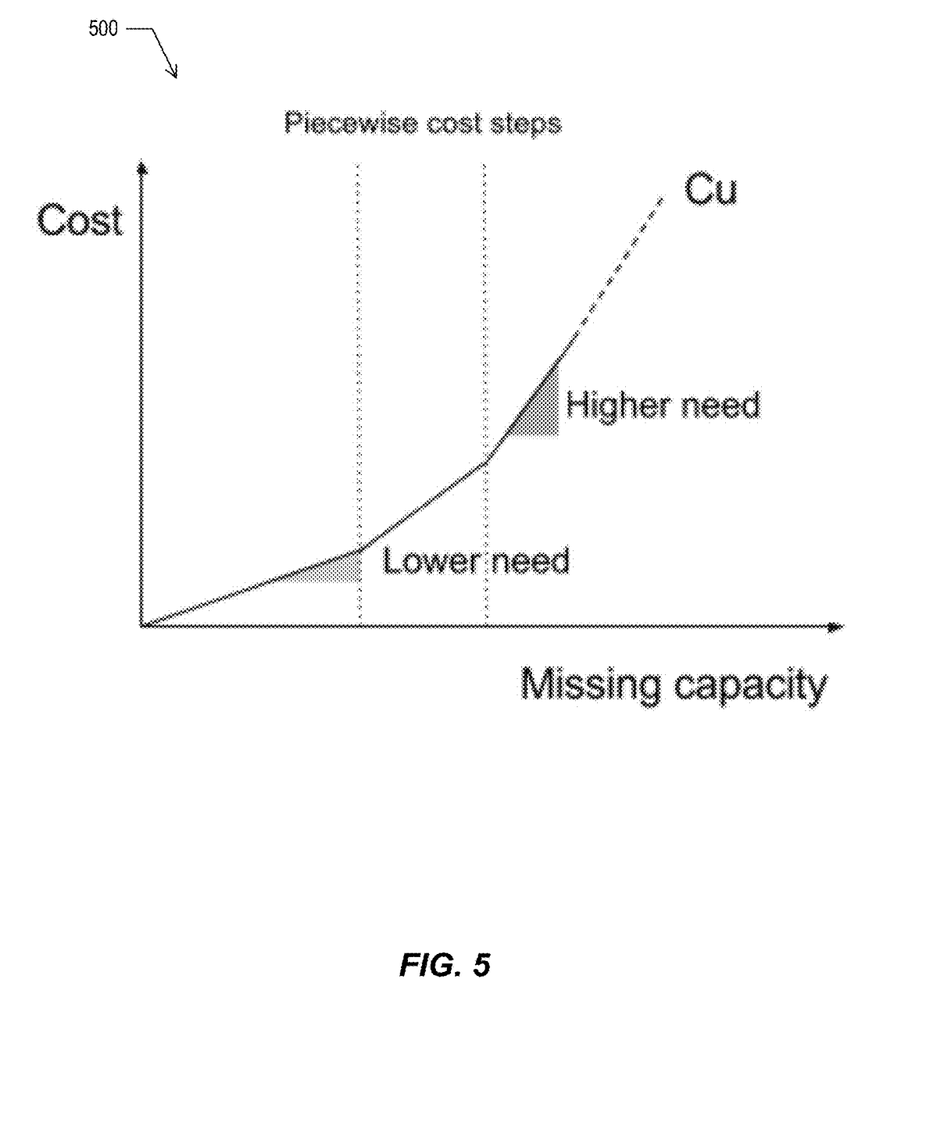
FIG. 5 depicts an example graph showing different rewards for allocating capacity to cluster(s), according to implementations of the present disclosure.

FIG. 5 depicts an example graph 500 showing different rewards for allocating capacity to cluster(s), according to implementations of the present disclosure. The graph represents the different rewards for allocating the same capacity (horizontal interval) to a cluster with higher or lower need. The larger height of the "higher need" triangle means that it is prioritized over the "lower need" triangle. Had the cost function $C_u$ been completely linear rather than piecewise linear, the two triangles would be the same size.

Penalty for over-fulfillment. In addition to the above, a cluster may be slightly penalized for going above its ideal capacity. This has two purposes: 1) to discourage clusters from getting larger machines than needed, and 2) to gently reclaim unused capacity for inventory even when not needed by other clusters, to speed up subsequent compute bursts. This penalty is lower than $C_u$ and it is linear except for the discontinuity at zero. Similar to $C_u$, a dummy variable may be used in the LP for this.

Reward for data locality. There may be significant performance gains from co-locating compute and storage nodes. Hadoop takes locality into account when scheduling tasks, and implementations do so as well at the higher, inter-cluster level. In some implementations, a reward (e.g., negative cost), $C_{locality}$, is assigned to every node A—cluster B pair for which a storage node of cluster B exists on the same physical machine as node A. This reward may be higher than almost all other node preferences, similar to "node busy" above.

Reward for rack diversity. Implementations may introduce rack awareness to encourage a cluster to span new racks, without having implemented DataNode awareness. The reward (e.g., a negative cost) may be given for the first node of a cluster on each rack. Implementations may also introduce more steps (2, 3, . . . with decreasing rewards), where the rewards are non-linear in the number of nodes to avoid situations where the policy does not reward diversity at all, e.g., situations where ten nodes would always get 10× the rack reward even if they are all on the same rack. Rack diversity may be weighted more heavily in implementations where DN containers are managed using the same algorithm, because it would improve availability of the data in case of power outages or disconnections that affect some but not all racks.

Penalty for going below plan minimum. In some implementations, a (e.g., steep) penalty $C_{belowmini}$ is charged per unit of capacity that a cluster is below its plan minimum, as computed from customer information in the backend database. This constraint may ensure that the system prioritizes restoring cluster capacity to its minimum above almost every other action. Implementations may impose a penalty rather than using a hard constraint for this purpose to allow very high-value clusters to appropriate nodes even when this results in other clusters going below their minimum. Plan maximums may not be implemented in the same way. Instead, implementations may (e.g., forcibly) trim the pressure parameter. Some implementations employ a non-linear function here as well, to de-emphasize a cluster that approaches its maximum allowed capacity.

Some or all of the above costs and rewards may be combined in a single function, with varying importance. Implementations may examine and tune any suitable number of variables including per-cluster variables, or variables that are useful for handling predictable outages or unforeseen issues.

Some implementations employ a higher level programming interface provided by GLPK, e.g., GMPL, a variant of the AMPL modeling language provided by commercial optimizers, which keeps the problem relatively compact and lets GLPK preprocess and expand the full set of variables. This approach helps compartmentalize development given that the LP can be easily tested by itself. Implementations may also use the command line interface into GLPK, glpsol, which runs the GMPL preprocessing. A chunk of GMPL code that runs after GLPK computes the solution outputs both LP-derived statistics about the solution (e.g. costs of moving nodes) and formatted lines that the scheduler recognizes about the moves that need to be affected. Use of the LP with GLPK may provide satisfactory scalability. Typical cases may take an insignificant amount of time to solve, while a large case, e.g., pairing 100 nodes with 10 clusters, may run in about a second, unless the problem is artificially flat (e.g., most assignments essentially interchangeable). Even then, cutting the search off after 10 seconds (the GLPK time limit) may also produce an optimal solution. Implementations may also employ commercial solvers such as Gurobi.

In some implementations, the scheduler may determine a set of nodes to be moved, as well as a set of metrics to be collected and consumed downstream. Various example scenarios are listed below.

Example 1—Execution Stage

Once the scheduler determines the changes that need to be made, it sends the commands to the orchestrator to enact them, in parallel whenever possible. The add/remove nodes orchestration process may place some limitations on what can be done in parallel. For example, simultaneous add and remove cannot run on the same cluster, even if the system determines it is best to replace a node (e.g. because that node is too large).

Example 2—Deferred Operations

When some of the operations have to wait for others, the system executes the first round, then exits, postponing the operations for the next execution. The rationale is that the load situation might change considerably by the time some of the flows finish, particularly if the system had to wait for nodes to be evicted, so it may be best to re-analyze the metrics the scheduler depends on. While implementations may do this in the same process, this introduces complexity and the possibility of a never-ending run that may be harder to debug.

Example 3—Error Handling and Long Flows

Orchestration processes can take a long time, particularly when waiting for busy nodes to become idle, and sometimes execution fails completely. To the extent possible, the scheduler may be allowed to continue operating on the infrastructure as a whole, even when one cluster is experiencing some sort of failure.

In many situations, clusters have a dynamically changing need for computational resources. To achieve better performance and to increase resource utilization, implementations may employ containers to implement a multi-tenant elastic big data infrastructure. As described above, implementations provide an appropriate abstraction of hosts that allows the software to be independent of the underlying platform. In some implementations, Linux containers may be employed as a light-weight virtualization. Such containers may be useful for enabling elasticity because they provide appropriate abstractions for isolation and resource allocation. Implementations contribute to providing an elastic big data infrastructure to users in a multi-tenant environment. Implementations increase the responsiveness of the system, and use dynamic scheduling techniques to balance the cost and utilization of the underlying infrastructure with user expectation for instantaneous access to computation.

Figure 6:
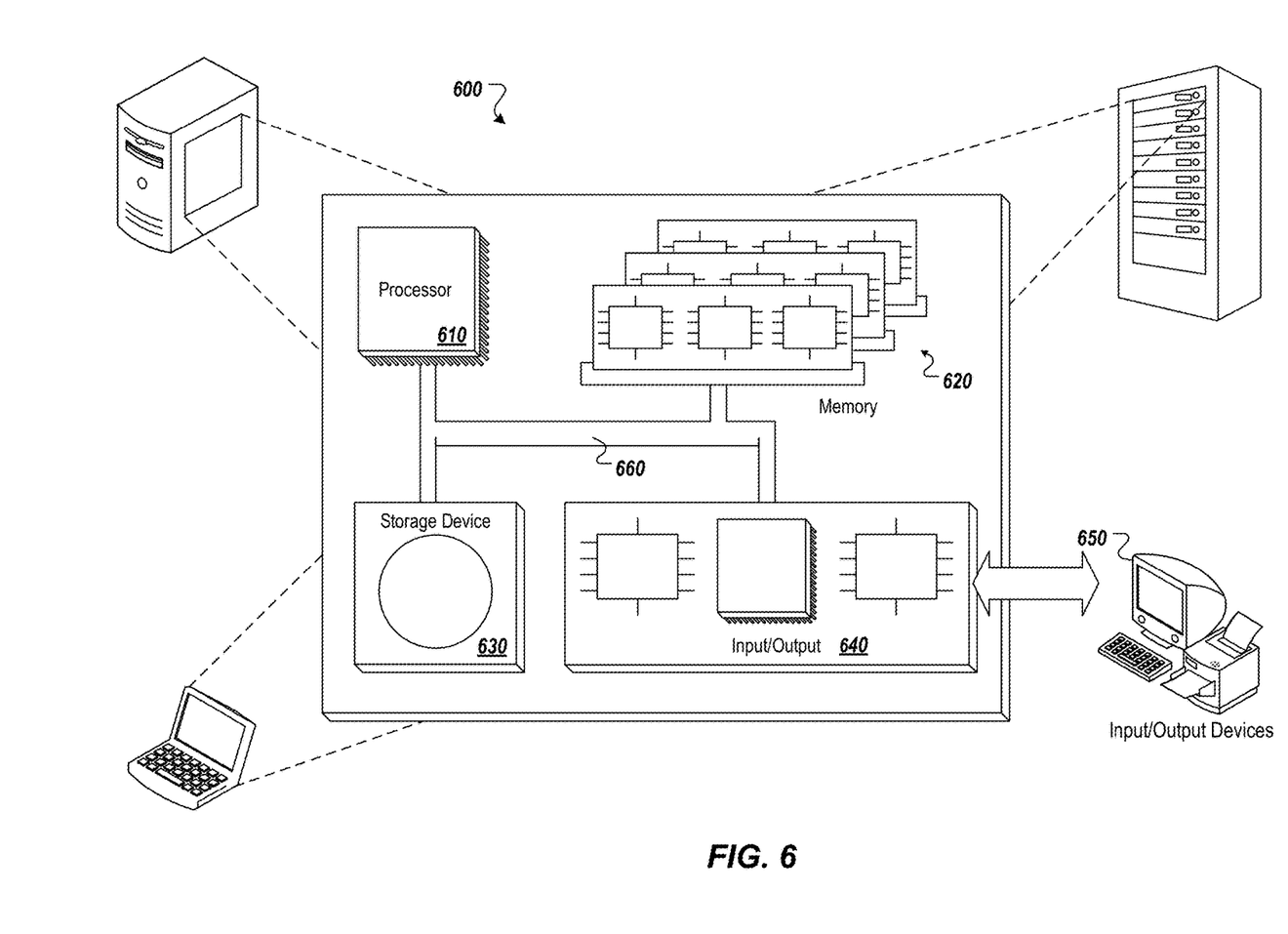
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more of the computing device(s) or system(s) described herein. The system 600 may include one or more processors 610, a memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. For example, the processor(s) 610 may execute instructions for the various software module(s) described herein. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more communication networks using any network protocol.

Computing devices of the system 600 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   receiving, by at least one processor, metrics from each of a plurality of clusters in a multi-tenant computing environment, the metrics at least indicating available computing resources and pending computing resources on each of the plurality of clusters, wherein the computing resources are provided by containers executing on the plurality of clusters, and wherein the metrics are generated by one or more of a resource manager and a node manager that executes on each of the plurality of clusters;
   based at least partly on at least one of the metrics indicating that at least one under-utilized container is executing on a first cluster and that a second cluster has pending computing resources, determining, by at least one processor, a plan to move the at least one under-utilized container from the first cluster to the second cluster, wherein the plan is determined based on minimizing a total cost of moving the at least one under-utilized container from the first cluster to the second cluster; and
   executing, by at least one processor, the plan to move the at least one under-utilized container from the first cluster to the second cluster, wherein moving the at least one under-utilized container from the first cluster to the second cluster comprises:
      instructing a resource manager of the first cluster to enqueue no further jobs to run on the at least one under-utilized container, allow currently running jobs to terminate, and destroy the at least one under-utilized container on the first cluster; and
      launching a new instance of the at least one under-utilized container on the second cluster.

2. The method of claim 1, wherein each of the containers runs an instance of a software framework.

3. The method of claim 1, wherein each of the containers executing in a cluster synchronizes its time with other processes running in the cluster.

4. The method of claim 1, wherein each of the containers provides a root user that is a non-privileged user of a computing device that executes the container.

5. The method of claim 1, further comprising:
   smoothing, by the at least one processor, the metrics prior to using the metrics to determine the plan, wherein smoothing the metrics includes determining, for at least one of the plurality of clusters, that a pending metric for a respective cluster is a highest pending metric that satisfies at least one condition that the pending metric is above a predetermined threshold value for at least a predetermined time period.

6. The method of claim 1, wherein the metrics include one or more of:
   pending memory capacity;
   pending processor capacity;
   available memory capacity;
   available processor capacity;
   allocated memory capacity;
   allocated processor capacity; and
   number of applications currently running.

7. The method of claim 1, wherein:
   the total cost is sum of component costs including one or more of:
      a penalty for moving nodes;
      a penalty for under-fulfillment;
      a penalty for over-fulfillment;
      a reward for data locality;
      a reward for rack diversity; and
      a penalty for going below plan minimum.

8. A system comprising:
   at least one processor; and
   a memory communicatively coupled to the at least one processor, the memory storing instructions which, when executed, cause the at least one processor to perform operations comprising:
      receiving metrics from each of a plurality of clusters in a multi-tenant computing environment, the metrics at least indicating available computing resources and pending computing resources on each of the plurality of clusters, wherein the computing resources are provided by containers executing on the plurality of clusters, and wherein the metrics are generated by one or more of a resource manager and a node manager that executes on each of the plurality of clusters;
      based at least partly on at least one of the metrics indicating that at least one under-utilized container is executing on a first cluster and that a second cluster has pending computing resources, determining a plan to move the at least one under-utilized container from the first cluster to the second cluster, wherein the plan is determined based on minimizing a total cost of moving the at least one under-utilized container from the first cluster to the second cluster; and
      executing the plan to move the at least one under-utilized container from the first cluster to the second cluster, wherein moving the at least one under-utilized container from the first cluster to the second cluster comprises:
         instructing a resource manager of the first cluster to enqueue no further jobs to run on the at least one under-utilized container, allow currently running jobs to terminate, and destroy the at least one under-utilized container on the first cluster; and
         launching a new instance of the at least one under-utilized container on the second cluster.

9. The system of claim 8, wherein each of the containers runs an instance of a software framework.

10. The system of claim 8, wherein each of the containers executing in a cluster synchronizes its time with other processes running in the cluster.

11. The system of claim 8, wherein each of the containers provides a root user that is a non-privileged user of computing device that executes the container.

12. The system of claim 8, the operations further comprising:

smoothing the metrics prior to using the metrics to determine the plan, wherein smoothing the metrics includes determining, for at least one of the plurality of clusters, that a pending metric for a respective cluster is a highest pending metric that satisfies at least one condition that the pending metric is above a predetermined threshold value for at least a predetermined time period.

13. One or more non-transitory computer-readable storage media storing instructions which, when executed, cause at least one processor to perform operations comprising:

receiving metrics from each of a plurality of clusters in a multi-tenant computing environment, the metrics at least indicating available computing resources and pending computing resources on each of the plurality of clusters, wherein the computing resources are provided by containers executing on the plurality of clusters, and wherein the metrics are generated by one or more of a resource manager and a node manager that executes on each of the plurality of clusters;

based at least partly on at least one of the metrics indicating that at least one under-utilized container is executing on a first cluster and that a second cluster has pending computing resources, determining a plan to move the at least one under-utilized container from the first cluster to the second cluster, wherein the plan is determined based on minimizing a total cost of moving the at least one under-utilized container from the first cluster to the second cluster; and executing the plan to move the at least one under-utilized container from the first cluster to the second cluster, wherein moving the at least one under-utilized container from the first cluster to the second cluster comprises:

instructing a resource manager of the first cluster to enqueue no further jobs to run on the at least one under-utilized container, allow currently running jobs to terminate, and destroy the at least one under-utilized container on the first cluster; and launching a new instance of the at least one under-utilized container on the second cluster.

14. The one or more non-transitory computer-readable storage media of claim 13, wherein each of the containers provides a root user that is a non-privileged user of a computing device that executes the container.

15. The one or more non-transitory computer-readable storage media of claim 13, wherein the metrics include one or more of:

pending memory capacity;
pending processor capacity;
available memory capacity;
available processor capacity;
allocated memory capacity;
allocated processor capacity; and
number of applications currently running.

16. The one or more non-transitory computer-readable storage media of claim 13, wherein:

the total cost is sum of component costs including one or more of:
a penalty for moving nodes;
a penalty for under-fulfillment;
a penalty for over-fulfillment;
a reward for data locality;
a reward for rack diversity; and
a penalty for going below plan minimum.

* * * * *